Figure 1:
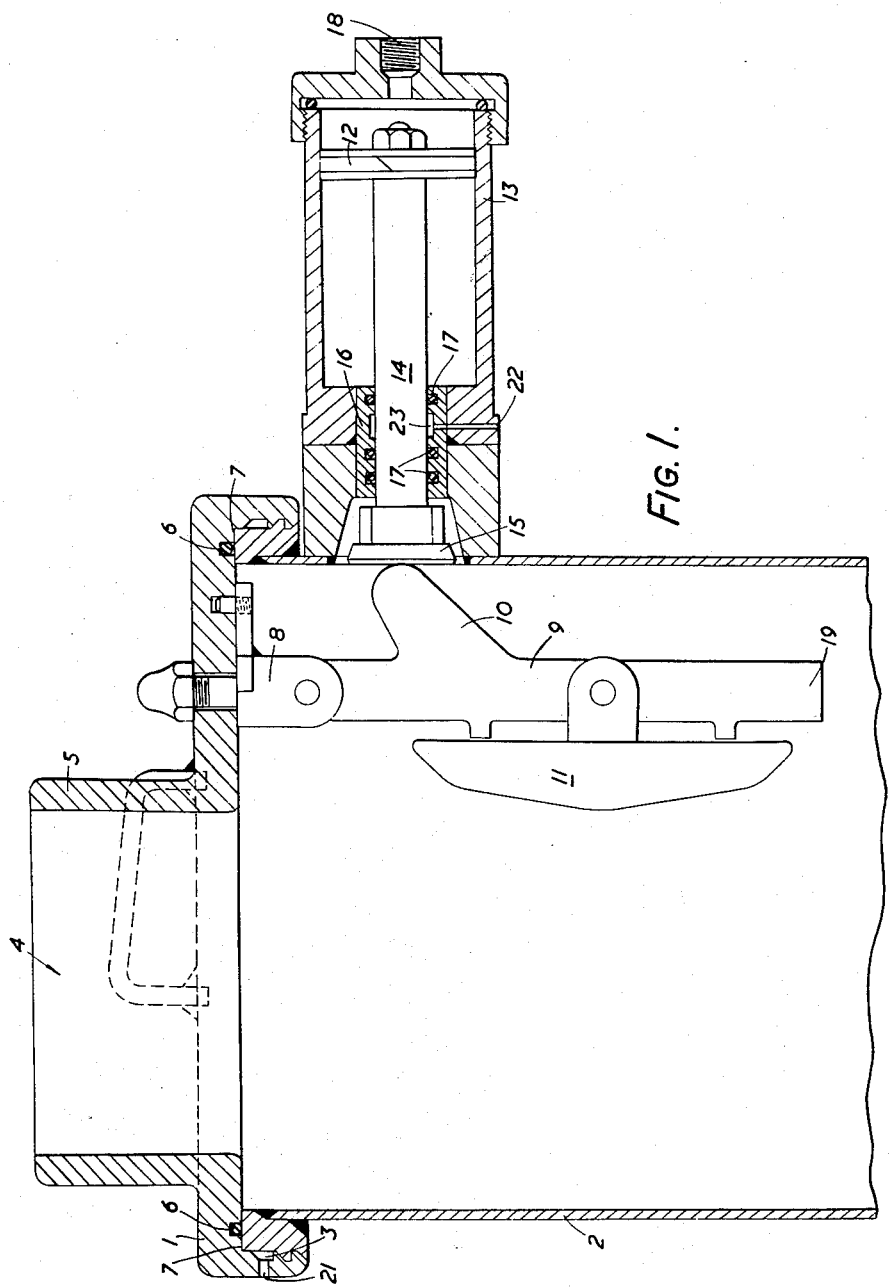

Dec. 17, 1963 T. STEELE 3,114,389
VALVES
Filed July 2, 1962 3 Sheets-Sheet 1

INVENTOR
T. Steele
BY
ATTORNEY

Dec. 17, 1963 T. STEELE 3,114,389
VALVES
Filed July 2, 1962 3 Sheets-Sheet 2

INVENTOR

BY

ATTORNEY

Dec. 17, 1963 T. STEELE 3,114,389
VALVES
Filed July 2, 1962 3 Sheets-Sheet 3

INVENTOR

BY

ATTORNEY

United States Patent Office 3,114,389
Patented Dec. 17, 1963

3,114,389
VALVES
Thomas Steele, deceased, late of Wishaw, Scotland, by Robert Steele, executor, Motherwell, Scotland, assignor to Morton Machine Company Limited, Wishaw, Scotland
Filed July 2, 1962, Ser. No. 207,129
Claims priority, application Great Britain July 3, 1961
2 Claims. (Cl. 137—583)

This invention relates to valves, more particularly, though not exclusively, to valves for regulating the flow of granular material or liquids into a container the interior of which is at a pressure different from atmospheric pressure.

In United Kingdom patent specification No. 767,403 there is described a mixing machine, particularly for mixing confectionery ingredients, comprising a mixing chamber, an auxiliary chamber, means for feeding the contents of the latter to the former and means for equalising the pressure above the contents of each of the two chambers. The auxiliary chamber may be charged from a hopper and a problem has arisen of finding a valve suitable for regulating the flow of material from the hopper to the auxiliary chamber.

This problem is most evident when flour with a high fat content is to be introduced into the mixing machine especially when some automation of the sequence of charging, mixing and discharging is required. For example, when producing doughnut batter it was desired to store the doughnut flour, which has a much higher fat content than ordinary flour, in the hopper, introduce it to the mixing chamber through a valve, close the valve, mix the batter under pressure and discharge it when fully mixed and then to repeat the process throughout the working day without removing the mixing chamber lid, the sequence of the process being controlled by a timer.

The difficulty experienced was that known valves were unable to provide an adequate seal when closed to maintain a pressure of between zero and 44 pounds per square inch which may exist in the mixing chamber, and bridging of the doughnut flour took place except when a large input aperture was used. Large input apertures require valves of such a size that they are clumsy, and no known valve was found to be efficient for the purpose required.

According to the present invention, a valve comprises a closure member associated with means actuable by fluid operated means to move the closure member to a valve-closed position, the said means being so constructed that the closure member moves under gravity to a valve-open position when the fluid operated means are de-energised.

In apparatus including a container, the interior of which is subjected to pressures different from atmospheric pressure, to which material is to be supplied via a valve embodying the invention, the container is provided with a lid or cover member having an opening formed with a seating for the valve closure member. According to a feature of the invention the container is provided with an abutment which is so disposed as to engage in the manner of a lock a portion of the linkage device on attempted removal of the lid thereby preventing removal which is desirable especially when the container is under pressure different from atmospheric pressure.

Figure 2:
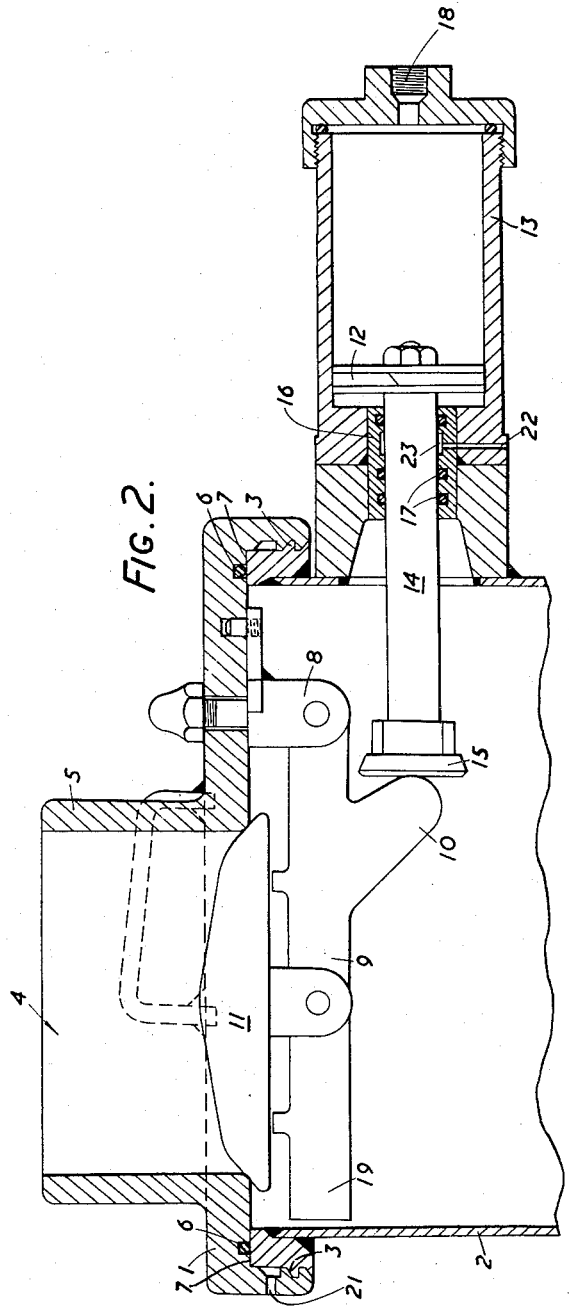
Figure 4:
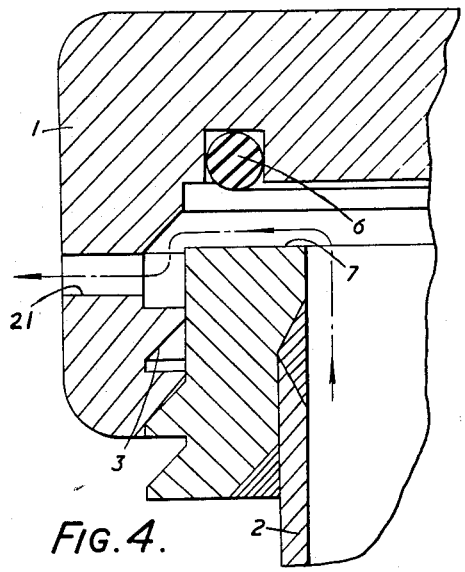
Figure 3:
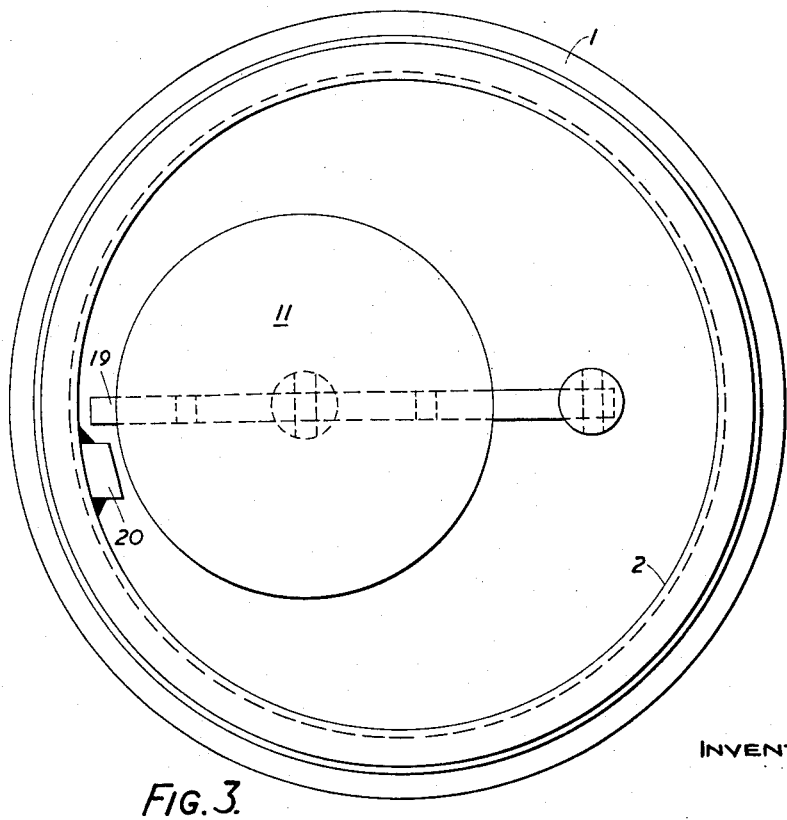

A valve assembly embodying the invention will now be described in greater detail by way of example, with reference to the accompanying drawings in which:

FIGURE 1 shows a section of the valve assembly with the valve in the open position, FIGURE 2 shows a section of the valve assembly with the valve in the closed position, FIGURE 3 shows a plan view of FIGURE 2, and FIGURE 4 shows a detail on an enlarged scale of part of FIGURE 1.

Referring to the drawings, the valve assembly is fitted to a cover member or lid 1 for a container 2. The lid 1 has coarse buttress threads 3 for screwing on to the container. The lid has a circular opening 4 defined by an upstanding collar 5 and a hopper, not shown, containing material to be fed to the container 1 is disposed above this opening. An O-ring seal 6 accommodated in an annular groove formed in the under surface of the lid 1 serves to make the container gas-tight when the lid is screwed on to the container and the valve is closed. The O-ring seals against the upper rim 7 of the container 2.

Secured to the lid 1 is a downwardly projecting lug 8 pivotally supporting an arm 9 which is formed with a projection 10 on one side and on the opposite side carries a mushroom-shaped valve closure member 11. The valve closure member 11 is rubber covered to ensure a gas-tight fit when in engagement with the valve seat constituted by the lower inner edge of the opening 4.

The valve closure member 11 is operated by a pneumatically operated piston 12 which works in a cylinder 13 secured to the side of the container 2. The piston 12 is secured to a rod 14 which has an enlarged end 15 engageable with the projection 10 of arm 9. The rod 14 is slidably mounted in a bearing 16 and is sealed therein by O-rings 17.

Assuming the valve to be in the position shown in FIGURE 1, then upon the application of air pressure to the cylinder 13 via an inlet 18, the piston 12 will move along the cylinder causing the end 15 of the rod 14 to engage projection 10 on arm 9, so that the arm and valve closure member 11 are swung to the closed position shown in FIGURE 2. The end 15 of rod 14 remains in engagement with the projection 10 due to maintained pressure in the cylinder 13 and if the container itself is pressurized then the valve closure member 11 is further aided to maintain a gas-tight closed position.

When the valve closure member 11 is in the closed position, the end 19 of the arm 9 remote from the lug 8 rests adjacent a stop 20 (FIGURE 3) formed on the inside of the container 2. This construction prevents the unscrewing of lid 1 when the valve closure member 11 is closed and thereby prevents inadvertent release of any pressure which may exist in the container.

As shown most clearly in FIGURE 4, the lid 1 has a radial hole 21 drilled in it so that in the event of the lid being only partially screwed on to the container 2, and the O-ring 6 therefore not in engagement with rim 7, the hole 21 forms an outlet for any pressure which may try to build up while the lid is insecure. A plurality of holes 21 may be provided to enhance this safety feature.

When the valve is to take up the open position of FIGURE 1 from the closed position of FIGURE 2, the pressures in the container 2, if any, and in the cylinder 13 are released and the valve 11 will fall under gravity to the position shown in FIGURE 1. At the same time the piston 12 will be pushed along the cylinder.

The buttress threads on the lid 1 and container 2 may be milled away over a portion to allow quick breech action of the lid.

The cylinder 13 is provided with a hole 22 which connects with an annular groove 23 in bearing 16, this construction allowing for leakage of any pressure difference which may exist between the container 2 and cylinder 13.

A valve according to the invention used with a mixing machine such as is described in patent specification No. 767,403 can work in conjunction with a timing device which is preferably fitted to the mixer to introduce a degree of automation. In this application, flour would be admitted to the auxiliary chamber via the valve and the valve would then be closed by application of air pressure to cylinder 13. At a predetermined moment in the time cycle a flour feeder impeller conveys the flour to the mixing chamber which is pressurized and after mixing, the mixture is discharged.

It will be apparent that a valve constructed in accordance with the invention provides a simple valve which is easily disassembled for cleaning or maintenance. Also the construction is particularly useful for feeding granular material or liquids to a container which works under air, gas or vacuum pressure.

It will be understood that the valve may be operated hydraulically or by any other convenient means.

What is claimed is:

1. A mixing machine including a container, an apertured lid threadedly mounted on said container, a valve for closing the aperture in said lid, said valve comprising an arm pivotally mounted at one end on said lid, and a valve closure member and an extension piece both carried by said arm, a fluid-actuated means for engaging said extension piece to move said valve to an aperture closing position, a stop member disposed on the inner surface of said container, the end of said arm remote from the pivotally mounted end being positioned to cooperate with the stop member to prevent relative rotational movement between said lid and said container when said valve is in the closed position.

2. A mixing machine according to claim 1, further including means for preventing pressurisation of said container when said lid is incorrectly seated on the container.

References Cited in the file of this patent

UNITED STATES PATENTS

| | | |
|---|---|---|
| 1,799,288 | Davis | Apr. 7, 1931 |
| 2,482,198 | Melichar | Sept. 20, 1949 |
| 2,790,309 | Wenzelberger | Apr. 30, 1957 |